(12) United States Patent
Morrill

(10) Patent No.: US 6,332,626 B1
(45) Date of Patent: *Dec. 25, 2001

(54) TOW BAR FOR TOWING TONGUELESS VEHICLES

(76) Inventor: J. Stephen Morrill, P.O. Box 1629, Waldport, OR (US) 97394

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/636,240

(22) Filed: Apr. 23, 1996

(51) Int. Cl.[7] .............................. B60D 1/155; B60D 1/54
(52) U.S. Cl. ....................... 280/491.3; 280/494
(58) Field of Search ............................. 280/491.1, 491.3, 280/491.5, 492, 493, 494, 495

(56) References Cited

U.S. PATENT DOCUMENTS

| | | | |
|---|---|---|---|
| 3,342,508 | * | 9/1967 | Thomas ................................. 280/494 |
| 4,194,755 | * | 3/1980 | Youngblood ....................... 280/491.3 |
| 4,372,568 | * | 2/1983 | Campbell ........................... 280/491.3 |
| 4,588,199 | * | 5/1986 | Fisher ..................................... 280/494 |
| 4,913,451 | * | 4/1990 | Woodall ............................. 280/491.5 |
| 5,226,657 | * | 7/1993 | Dolphin ............................. 280/491.1 |

FOREIGN PATENT DOCUMENTS

| | | | |
|---|---|---|---|
| 2225540 | * | 12/1973 | (DE) .................................. 280/491.3 |
| 9205040 | * | 4/1992 | (WO) ..................................... 280/494 |

* cited by examiner

Primary Examiner—James R. Brittain
Assistant Examiner—John L. Beres
(74) Attorney, Agent, or Firm—Wiliam S. Lovell; Rose Jade

(57) ABSTRACT

This invention is a multi use tow bar for towing one vehicle behind the other, which is very simple in design in that it consists of a single (segmented) shaft which is rigidly attached to the rear of the towing vehicle (with a single component attachment device), a simple vertically rotating joint, and a rearward long shaft segment which is attached to the center of the front of the towed vehicle by a single coupler/ball. This tow bar is suitable for a broad range of situations where one vehicle tows another vehicle on a continuing basis and ease of attachment and disattachment of the two vehicles is important.

8 Claims, 7 Drawing Sheets

SCALE : NOT TO SCALE -
ILLUSTRATION ONLY

SCALE 1 INCH TO 5.22

SCALE 1 INCH TO 5.22

SCALE : NOT TO SCALE -
    ILLUSTRATION ONLY

SCALE : NOT TO SCALE - ILLUSTRATION ONLY

SCALE : 1 INCH TO 5.22

SCALE : 1 INCH TO 5.22

TOW BAR FOR TOWING TONGUELESS VEHICLES

BACKGROUND

Field of the Invention

This invention is a device for towing one vehicle by another vehicle when neither vehicle in itself is equipped with a "tongue". Examples are; a Motor Home towing an automobile ("jitney"), a truck towing a smaller pickup truck or jeep, a grader towing a pickup truck, etc.

Simple "A Frame Type" tow bars have been in existence for years. These are often quite heavy with the design and construction intended for commercial applications. The size and weight of the tow bar device and method of attachment to the towed vehicle precludes easy removal and storage of the tow bar.

Over the last few years, more portable, light duty "tow bars" have come onto the market. These devices address the Motor Home and tow car ("jitney") market. Some of these are quite sophisticated . . . employing self aligning pistons or shafts, fold up features and so on. Some are quite complicated with multiple moving parts and adjustment mechanisms.

Most of the existing tow bar devices are attached to the front of the towed vehicle through the use of multiple attachments (e.g. pins or couplers to the frame of the jitney), and are fastened to a trailer hitch/ball mount on the rear of the towing vehicle. Most of them employ two "draw bars" that triangulate from the rear of the Motor Home to the front of the "jitney".

These prior art and market place available devices all differ from this application (Morrill tow bar) in that attachment to the rear of the towing vehicle is by means of a trailer hitch ball coupler and all of them employ multiple attachments to the front of the towed vehicle.

This application (Morrill tow bar) displays rigid attachment to the rear of the towing vehicle, a single segmented tow bar shaft and one ball/coupler in the center of the front of the towed vehicle.

Seven patents were found that employ single shafts (one of these actually employs two "single" shafts) as a tow bar. These are listed and discussed below:

| | Invention Title | Inventor |
|---|---|---|
| U.S. Pat. No. | | |
| 5,226,657 | Vehicle Towing Means | Dolphin, William A. |
| 4,194,755 | Tow Bar For Vehicles | Youngblood, John W. |
| 3,342,508 | Auxiliary Universal Tow Bar for Boat Trailers | Thomas, G. I. |
| 4,372,568 | Luggage and Accessory Trailer | Campbell, James H. |
| 4,588,199 | Swivel Connection for Trailers | Fisher, William E. |
| WIPO NO. | | |
| WO 92/05040 | Improved Tow Bar | Williams, Gregory J. |
| GER NO. | | |
| 2,225,540 | Fahrgestell fur Wohnwagen | Amtenbrink, Freidrich |

Each of these patents display specialized devices which are designed for unique circumstances. None of them display features suitable for the general tow bar market. None of them are suitable for the motor home and accessory vehicle ("jitney") market.

The Dolphin patent discloses a segmented single shaft. However this "single shaft" actually includes a compound frame structure and multiple moving parts including a crank/screw arrangement. Further, the patent discloses that this device was designed for the specific purpose of towing golf carts with the rear wheels in an elevated position. The features of this patent (crank/screw arrangement for elevating the golf cart rear wheels) which are unique are superfluous to a general usage tow bar (e.g. for Motor homes and towed cars).

The attachment to the rear of the towing vehicle is by means of a trailer hitch coupler/ball arrangement. The wording in the claims relative to the connection to the towing vehicle ("said hitch connector") is vague and ambiguous. However, the patent clearly discloses elsewhere that the "hitch connector" is a "hitch ball member" or "ball hitch assembly" which is attached to the "rear bumper member".

Careful review of this patent and the patent drawings raises serious doubt that the device is even functional in that there is no apparent mechanism to prevent the coupler from rotating downward on the "ball hitch assembly" when the crank/screw is employed to straighten the tow bar shaft segments.

The Dolphin patent is not really at all similar in design or purpose to this application (Morrill towbar). This is readily apparent when the characteristics of this application (Morrill tow bar) below and in the "Summary" herein are reviewed.

The Youngblood patent discloses a device to elevate the front wheels of a towed vehicle, specifically a "front wheel drive vehicle". It is very similar in purpose to the Campbel patent although intended for a much more heavy towed vehicle. It differs from the Campbell patent device in that it does display a chain/winch arrangement to hold the trailer hitch/coupler in a horizontal position when the tow bar is straightened to raise the towed vehicle. The attachment to the rear of the towing vehicle is by means of a trailer hitch coupler/ball and the cable winch apparatus. The device employs multiple attachment components to accomplish attachment to the chassis of the towed vehicle. The Youngblood patent device has multiple moving parts and complicated mechanisms compared to this application (Morrill tow bar).

The Thomas patent discloses a device which pivots at the draw bar attachment with intended facilitation of the loading and unloading of a boat from a boat trailer.

The Campbell patent is actually a "Luggage and Accessory Trailer" and is not really relevant to this application except for the fact that the trailer employs a single shaft tongue which could be construed as a "tow bar" in that it is detachable from the trailer by means of a receiver/sting arrangement and pin.

There is nothing in the patent descriptions or the "claims" to suggest that this "single shaft trailer tongue" is "anticipated" as a "tow bar" for towing one vehicle by another. Indeed, the language throughout the patent clearly discloses "small utility trailers that can be towed behind small vehicles".

The Fisher patent discloses a swivel connection to facilitate connection of a small trailer to a motorcycle. It is true the claims do not restrict the anticipated use to motor cycles and trailers. However, there is no effort in the claims to cover the towbar itself. The claims cover a spindle/swivel arrangement between the tongue of the trailer and the vehicle hitch assembly, for the purpose of enabling vertical; and horizontal rotation of the motor cycle relative to the trailer. This is a very narrow objective, solving the very specific problem that is encountered when a trailer is towed behind a motorcycle (i.e. The motor cycle leans to one side or the other when in operation and when parked while the two wheeled trailer does not). This patent obviously does not anticipate a tow bar for general usage.

The Williams patent discloses a device consisting of two tow bars to connect the bumper of a disabled vehicle to a towing vehicle, especially for retrieval of the disabled vehicle over rough terrain.

The Amtenbrink patent is in German. However, the drawing clearly discloses a tongue ( not a detachable tow bar) which is attached to the front of a "wagon" (camper trailer) with a yoke and one or two front wheels and which attaches to the rear of the towing vehicle by means of a trailer hitch ball and coupler arrangement. This arrangement is referred to as a "pull trailer" and facilitates towing of a heavy trailer by a vehicle which is too small to bear the weight of the front of a trailer.

Each of these seven prior art differ from this application (Morrill tow bar) as discussed above and as follows;
1. Attachment to the towing vehicle is by means of a ball hitch/coupler assembly (not rigid).
2. Attachment to the front of the towed vehicle is rigid—in most cases employing multiple and complicated coupling components or permanent.
3. The objectives are very specific and unique—not intended for general tow bar circumstances.

Applicant's review of prior art included many other patents that bear some similarity to this application (Morrill towbar).However, all of the prior art that was discovered, including the seven specifically enumerated above, share one or more of the following features and disadvantages.
1. Attachment to the rear of the towing vehicle is by means of a trailer hitch ball and coupler at the rear of the towing vehicle.
2. Attachment to the towed vehicle is achieved by multiple and comparatively complicated connecting devices.

One disadvantage of the prior art features Number one and two above, is the fact that the tow bar must either be folded and secured on the front of the towed vehicle when the towing operation is suspended, or removed from the front of the towed vehicle and stored separately. On the one hand, removal from the towed vehicle is time consuming and relatively complicated and the tow bar then is awkward to store.

On the other hand the tow bar folded and secured on the front of the "towed vehicle" is bulky and unsightly. Those models that fold vertically in front of the "towed vehicle" grill partially obscure visibility and present an additional hazard (the towbar falls down in front of the "towed vehicle" if the device that secures it fails).

Another disadvantage to these features is the fact that the vehicles cannot be backed up when coupled together without "jack knifing".

3. The prior art are all relatively complicated, usually with multiple moving parts.

One disadvantage is the resultant high cost of manufacturing. Another disadvantage is the increase in maintenance. Another disadvantage is the difficulty in coupling and uncoupling the two vehicles and activating the features of the various devices.

A number of tow bar devices have recently appeared on the market which are attached to the rear of the Motor Home or towing vehicle, and are similar in this respect to this application (Morrill towbar). This applicant was unable to discover patents covering these tow bars. There are patents covering various components ( e.g. Joints, etc.).

None of these tow bars employ the concept of rigid attachment to the rear of the towing vehicle combined with attachment at a single point In the center of the front of the towed vehicle. None of them have the feature of a vertically pivotable joint directly behind the attachment to the towed vehicle. Each of these other tow bars consist of multiple shafts and multiple attachments to the front of the towed vehicle by means of various pin and fastener devices which are vertically rotatable, but horizontally rigid to the towed vehicle. In each case, horizontal rotation is provided by relatively complex flexible joint (either directly behind the attachment to the towing vehicle or midway between the two vehicles).

Accordingly, the disadvantages enumerated above apply to these tow bars as well except that the tow bar can be removed from the towed vehicle and left hanging on the rear of the towing vehicle when not in use.

The applicant has observed and determined that removal from; and reattachment to, the front of the towed vehicle, is relatively difficult and time consuming due to the multiple tow bar shafts (which must be centered and aligned) and relatively complicated means of attachment to the front of the towed vehicle. This is especially true if the axis of the towing and towed vehicle differ either vertically or horizontally.

This application (Morrill tow bar) overcomes these disadvantages as outlined in the "Summary" below.

SUMMARY OF INVENTION

The towbar displayed in this application (Morrill tow bar) is a single (segmented) shaft tow bar which is rigidly attached to the rear of the towing vehicle (with a single component attachment device) and is attached to the center of the front of the towed vehicle by a single coupler/ball. This application tow bar is suitable for a broad range of situations where one vehicle tows another vehicle on a continuing basis and ease of attachment and disattachment of the two vehicles is important.

The features of this application (Morrill tow bar) included in the following overcome the disadvantages of the prior art as disclosed below:

This application (Morrill tow bar):
1. Incorporates a rigid single attachment to the center of the rear of the towing vehicle.
2. Achieves attachment to the center of the front of the towed vehicle with a single coupler/ball mount.

These features combined enable the two vehicles to be safely backed up without uncoupling them. This is unique. The towed vehicle "jack knifes" almost immediately when a motor home backs up with any other design of tow bar.

3. Employs a simple vertical joint (a yoke, center bar and pin).

Features 1, 2 and 3 above eliminate the problem of prior art devices in that the tow bar can be easily and quickly disconnected from the towed vehicle and rotated vertically without removal from the rear of the towing vehicle for storage. Both the "towed" and "towing" vehicle can then be operated safely.

The vertical joint also eliminates (or greatly reduces) the stress to the towbar and the attachment at the front of the towed vehicle when towing takes place on rough or uneven roadways.

4. Is an extremely simple design consisting of a (two segmented) single shaft, one moving part (the vertical joint) and the towed vehicle coupler.

The other patents disclose very complicated tow bar devices with multiple moving parts or fasteners (except for the motor cycle and camper trailer-which actually display trailer tongues-not tow bars for general use).

The simplicity of this application (Morrill tow bar) is in itself a distinctive feature which reduces the cost of manufacture-even for a heavy duty version. It also eliminates the necessity to maintain the multiple moving parts of the prior art devices. Further, long term storage (where it may desirable to remove the tow bar from the rear of the "towing vehicle") is simplified in that minimum storage space is required for the single shaft as opposed to the multiple (triangulated shafts) of the prior art devices that disclose intended general usage.

5. Is specifically designed for this rigid attachment to the rear of the towing vehicle in terms of the relative length of each segment and the vertical joint. The earlier patents not only do not anticipate rigid attachment to the towing vehicle, the devices that are disclosed by the other patents would not be suitable for such attachment.

BRIEF DESCRIPTION OF DRAWINGS

This application is supported by seven drawings:

These drawings are described as:

FIGS. 1 and 2:

Figure 1:
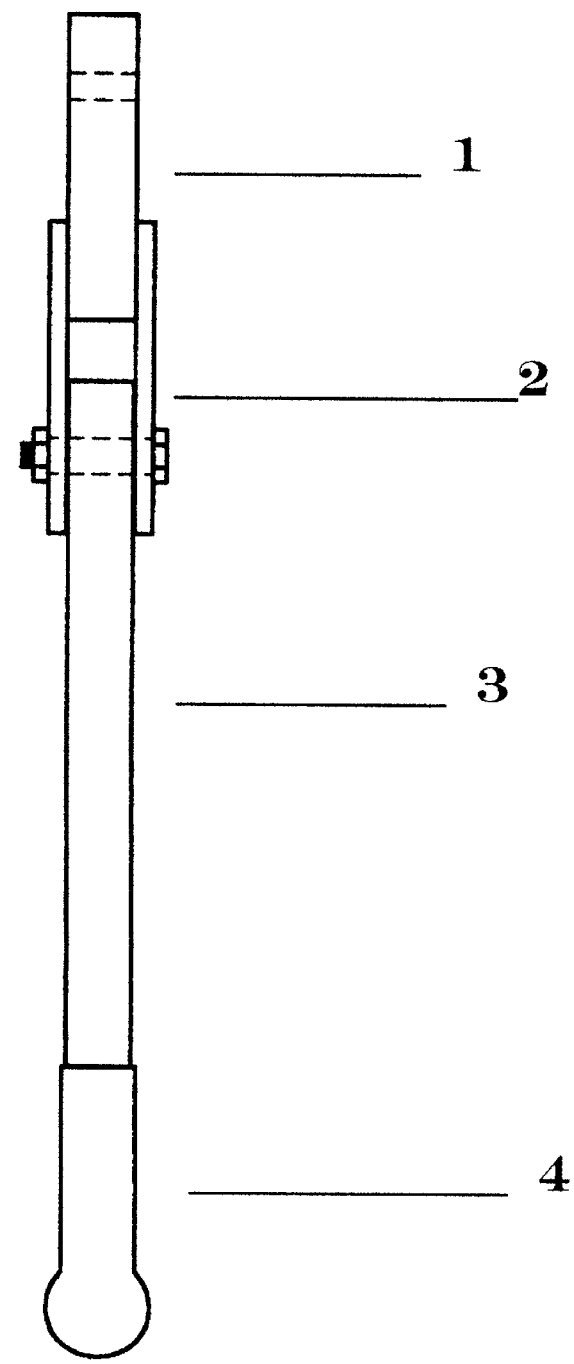
FIG. 1 Main Embodiment—Top View

These figures illustrate the Main Embodiment—top view and side view. The numbering of the drawing detail is the same for these two figures, accordingly, this description applies to both figures. Detail (1) is the short shaft segment that attaches rigidly to the rear of the motor home or other towing vehicle. Detail (2) is the vertically rotating joint. Detail (3) is the long shaft segment. Detail (3) is the "Hammerblow" brand coupler that attaches to the ball on the front of the towed vehicle.

FIG. 3:

This figure shows a side view of the Main Embodiment and illustrates the vertical rotation at the joint.

Detail (1) is the short shaft segment. Detail (2) is the vertically rotating joint. Detail (3) is the pivot point of rotational joint. Details (4) and (5) (the long shaft segment and the coupler) illustrate the vertical rotation of the long shaft segment and the coupler.

FIG. 4:

This figure does not depict specific components to scale. It illustrates the towing operation of the Main Embodiment with the "towing vehicle" being a Motor Home and the "towed vehicle" being a small automobile. Detail (1) is the rear of the motor home. Detail (2) is the front of the small automobile. Detail (3) is the tow bar in the "towing" position attached to trailer hitch ball [Detail (4)] which is mounted in the center of the front of the small automobile.

FIG. 5:

This figure does not depict specific components to scale. It illustrates the Main Embodiment with the "towed vehicle" (small automobile) detached from the "towing vehicle" (motor home). Detail (1) is the rear of the motor home. Detail (2) is the tow bar folded up behind the motor home. Detail (3) is the front of the small automobile. Detail (4) is the trailer hitch ball mount that is attached to the center of the front of the small automobile.

FIG. 6:

This illustrates the Alternative Embodiment—A. This embodiment differs from the main embodiment only in that the shaft segments are more equal in length which necessitates a motion limiting member to prevent excessive vertical rotation. Detail (1) is the shaft segment that attached to the center of the rear of the towing vehicle. Detail (2) is the rotation stop member which prevents excessive vertical rotation. Detail (3) is the vertical rotation joint. Detail (4) is the shaft segment that attaches to the front of the towed vehicle via the Detail (5) coupler that attaches to the trailer hitch ball mount at the center of the front of the towed vehicle.

FIG. 7:

This illustrates the Alternative Embodiment—B. This embodiment utilizes one shaft with ball couplers on both ends of the shaft. Detail (1) is the coupler that attaches to the trailer hitch ball mount attached to the center of the front of the towed vehicle. Detail (2) are turn buckle braces. Detail (3) is the main cross brace. Detail (3) is the coupler that attaches to the trailer ball mount at the rear of the towing vehicle.

DESCRIPTION OF MAIN EMBODIMENT—
FIGS. 1 through 5

The main embodiment is illustrated in FIGS. 1 through 5. The Main Embodiment of the Tow Bar is described as follows:

The forward member of the Main Embodiment is a short shaft segment (FIGS. 1 and 2—Detail 1) that is ordinarly disposed in a horizontal plane and has corresponding horizontal and vertical axes and which is made up of heavy walled steel tubing (which is commonly used in the construction of trailer hitch stinger/ball mounts). The front end of this short shaft segment simply slides into a conventional trailer hitch receiver mounted at the center of the rear of the Motor Home or other "towing vehicle".

Figure 2:
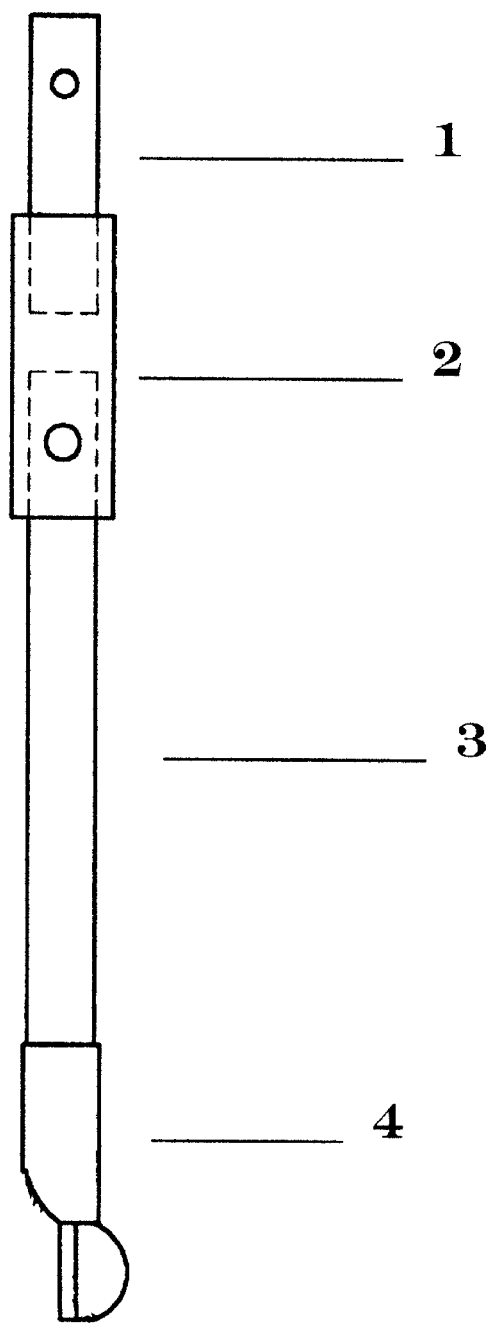
FIG. 2 Main Embodiment—Side View
Figure 3:
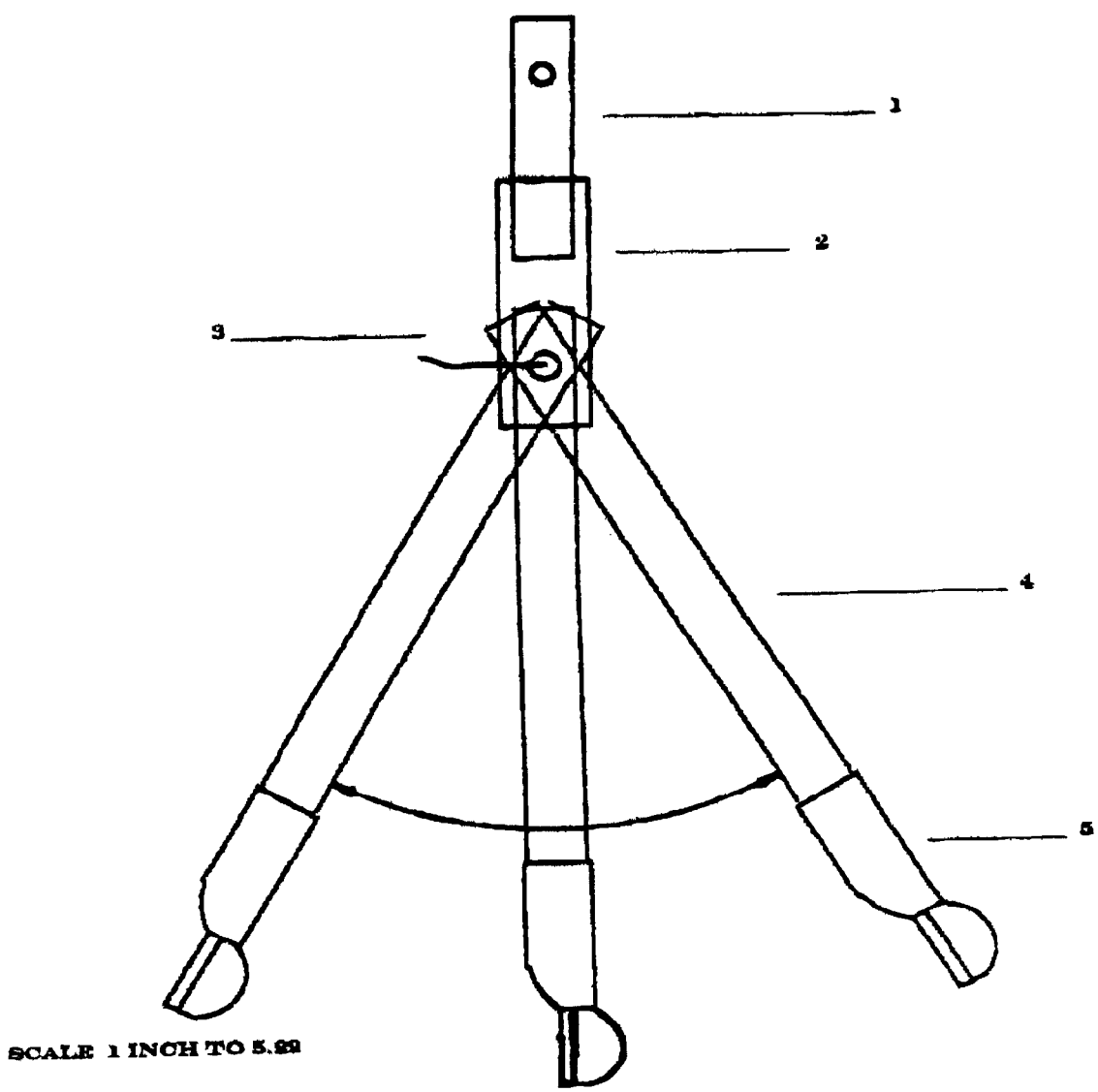
FIG. 3 Main Embodiment—Illustration of vertical rotation.

The rearward end of this short shaft segment is welded to two pieces of 1" by 2" steel flat bar which form the outer components of a simple vertically rotating joint as illustrated in FIGS. 1, 2 and 3—Detail 2. This joint is simply formed by enclosing the forward end of the long shaft segment within the two 1" by 2" flat bar outer components and providing a pivot point by inserting a grade eight ¾" bolt through a hole in the end of the shaft and the outer components as illustrated in FIG. 3—Detail 3.

This "long shaft segment" is made of heavy walled steel tubing with solid steel bar stock on the forward end (in the joint) and is illustrated in FIGS. 1 and 2—Detail 3.

The long shaft segment is welded into a Hammerblow brand "bull dog" trailer coupler (see FIGS. 1 and 2—Detail 4). This coupler attaches to a standard two inch ball mounted at the center of the front of the towed vehicle (See FIG. 5—Detail). The term "coupler" is defined as "a device for fastening or attaching a tow bar or trailer tongue to a trailer hitch ball assembly". (Reference to this conventional and "off the shelf" component is for descriptive purposes).

The main and alternative embodiments of "The Morrill Tow Bar" are as described above and illustrated in the Figures listed above. The operation of the device is to provide a safe and simple connection between the Motor Home (or other towing vehicle) and the towed vehicle.

Figure 4:
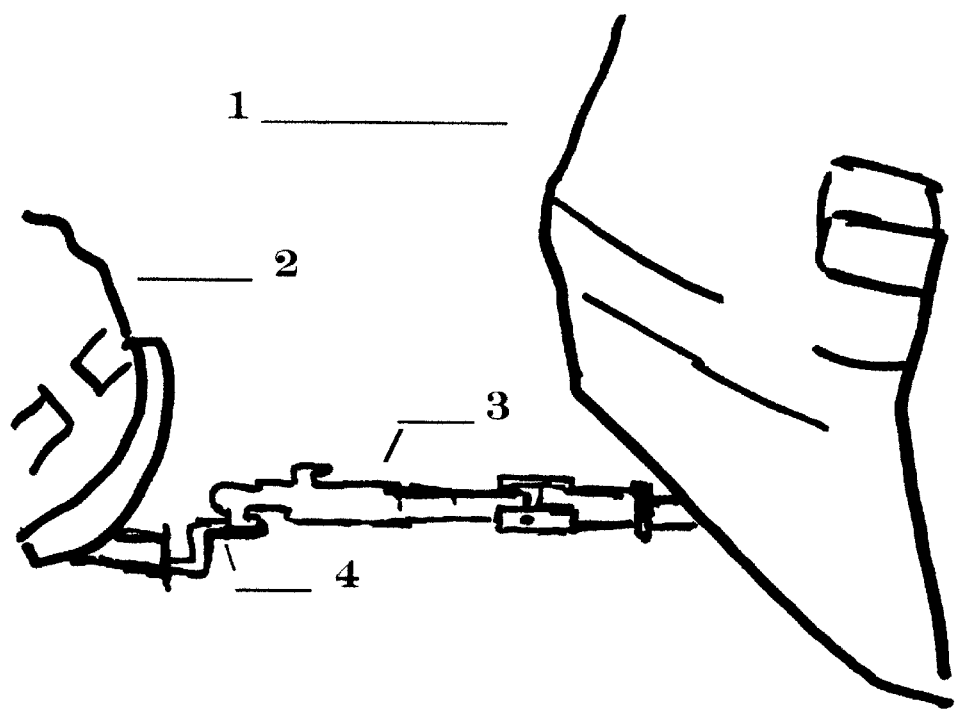
FIG. 4 Main Embodiment—Operation, towing mode

FIG. 4 illustrates the operation of the main embodiment in the "towing mode".

Figure 5:
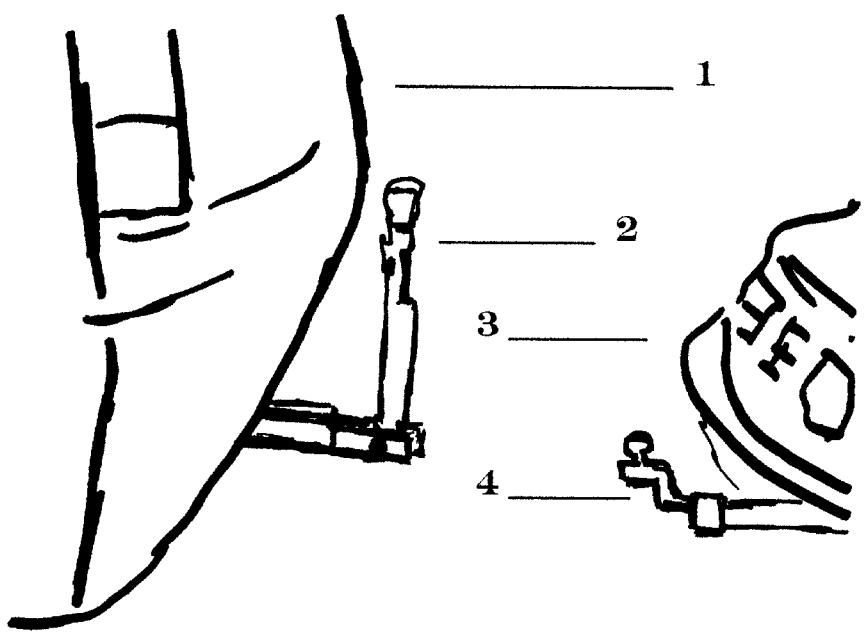
FIG. 5 Main Embodiment—Operation, detached mode
Figure 6:
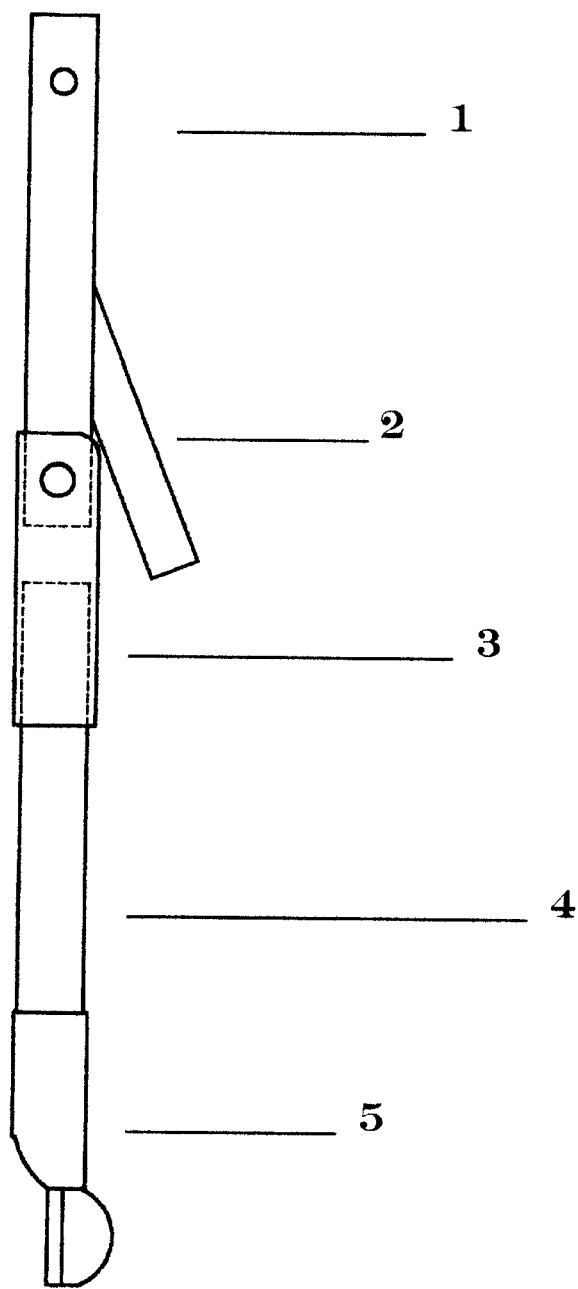
FIG. 6 Alternative Embodiment—A
Figure 7:
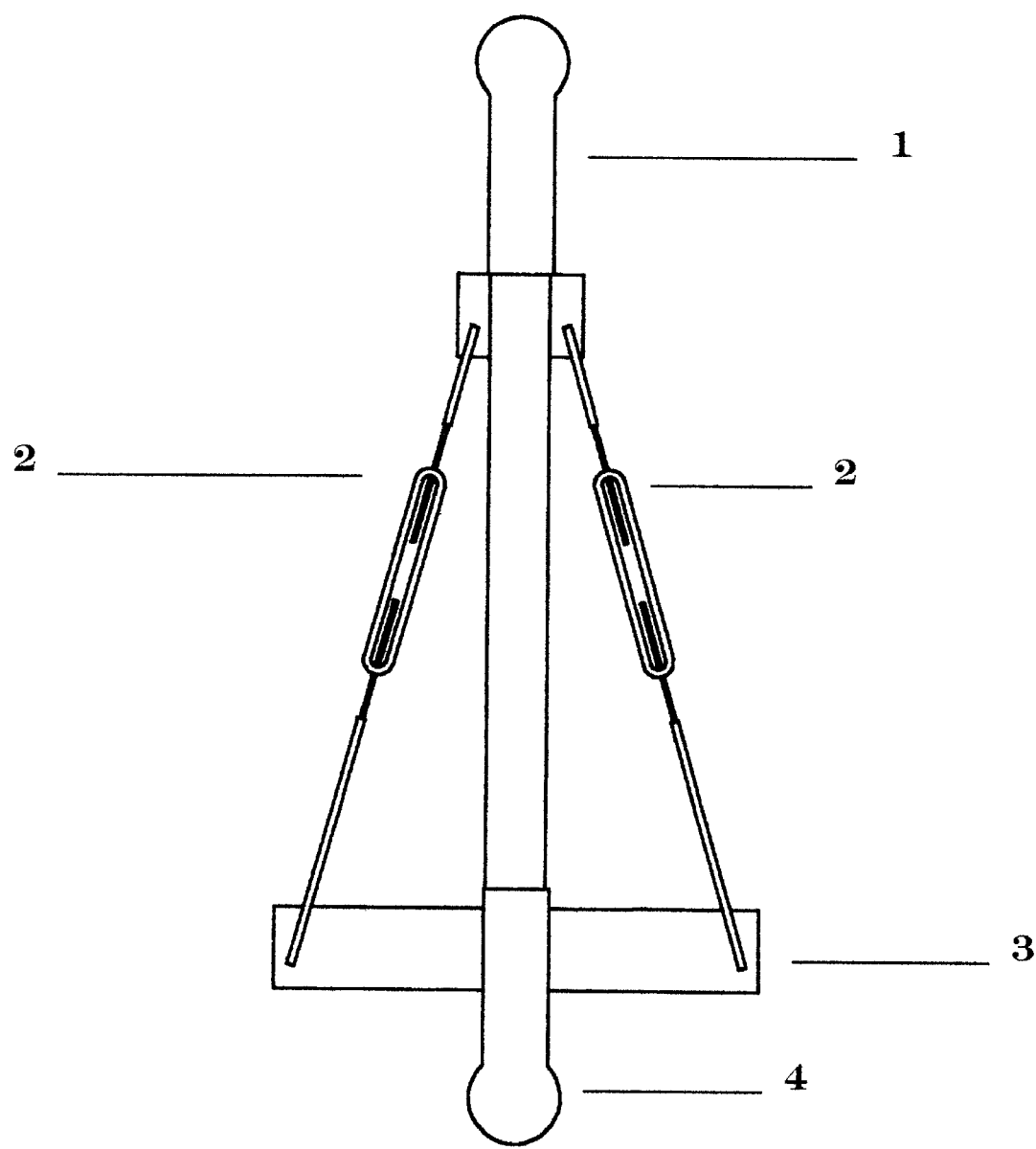
FIG. 7 Alternative Embodiment—B

FIG. 5 illustrates the main embodiment with the towed and towing vehicle detached from each other. The tow bar is in the stowed position (folded up vertically on the rear of the Motor Home).

Although the descriptions above include many specificities, this should not be construed as limiting the scope of the invention. These descriptions and figures of the Main Embodiment simply illustrate the "best mode for carrying out the invention". Alternative Embodiments A and B are earlier embodiment prototypes that were constructed and tested.

Future embodiments might well incorporate changes such as the following:

(a). Lighter materials (e.g. aluminum or other alloys) for light duty applications.

(b). Heavier materials for heavy duty applications.

(c). A different form of articulation joint for severe service applications.

(d). A different means of coupling to the front of the towed vehicle (an example is the copending patent application Ser. No. 08/792,028).

What is claimed is:

1. A tow bar connectable between a towing vehicle and a towed vehicle, comprising:

a rod-like first end rigidly and removably insertable into an elongate tube of a towing vehicle;

an elongate, segmented bar contiguous to said first end; and a second end of said tow bar connected to a distal end of said elongate, segmented bar and having a hitch receptacle rotatably and removably connectable to a trailer hitch ball of a towed vehicle.

2. The tow bar of claim 1 wherein said first end thereof is attachable to a rear portion of said first vehicle by means of insertion into an elongate aperture disposed on the rearward portion of said first vehicle and being adapted to receive and clamp onto said first end thereof.

3. The tow bar of claim 1 wherein said elongate bar comprises:

a forward bar shaft segment rigidly and removably attachable at a first end thereof to a rear portion of said first vehicle; and a rearward shaft segment rotatably attached at a first end thereof to a second end of said forward bar shaft segment and rotatably and removably attachable at a second end thereof to a front portion of said second vehicle.

4. The tow bar of claim 3 wherein said rearward shaft segment is rotatably attached at said first end thereof to said second end of said forward bar shaft segment about a horizontal axis.

5. The tow bar of claim 3 wherein said rearward shaft segment is rotatably attachable at said second end thereof to said front portion of said second vehicle about a vertical axis.

6. The tow bar of claim 3 wherein said rearward shaft segment is rotatably attachable at said first end thereof to said second end of said forward bar shaft segment about a horizontal axis and at said second end thereof to said front portion of said second vehicle about a vertical axis.

7. The tow bar of claim 5 wherein said second end of said rearward shaft segment further comprises a ball socket rotatably attachable to a vertically disposed trailer hitch ball assembly mounted on said front portion of said second vehicle.

8. Apparatus for towing vehicles, comprising:

a towing vehicle having disposed at a rear portion thereof an elongate tube adaptable to accept removable insertion of a shaft therein;

a tow bar having at a first end thereof a rod-like segment sized for removable insertion into said elongate tube, and at a second end thereof a hitch receptacle adapted to receive a trailer hitch ball; and a towed vehicle having disposed at an end portion thereof a trailer hitch ball sized for removable insertion into said hitch connector.

* * * * *